US010587937B2

(12) United States Patent
Lee et al.

(10) Patent No.: US 10,587,937 B2
(45) Date of Patent: Mar. 10, 2020

(54) PACKET AND OPTICAL INTEGRATION

(71) Applicant: Futurewei Technologies, Inc., Plano, TX (US)

(72) Inventors: Young Lee, Plano, TX (US); Italo Busi, Cerro Maggiore (IT)

(73) Assignee: Futurewei Technologies, Inc., Plano, TX (US)

( * ) Notice: Subject to any disclaimer, the term of this patent is extended or adjusted under 35 U.S.C. 154(b) by 110 days.

(21) Appl. No.: 15/948,850

(22) Filed: Apr. 9, 2018

(65) Prior Publication Data
US 2019/0313167 A1    Oct. 10, 2019

(51) Int. Cl.
*H04Q 11/00* (2006.01)

(52) U.S. Cl.
CPC ..... *H04Q 11/0003* (2013.01); *H04Q 11/0062* (2013.01); *H04Q 2011/0073* (2013.01)

(58) Field of Classification Search
CPC ...................................... H04Q 11/00
See application file for complete search history.

(56) References Cited

U.S. PATENT DOCUMENTS

| 10,432,514 | B2* | 10/2019 | Li | |
|---|---|---|---|---|
| 2002/0109879 | A1* | 8/2002 | Wing So | H04J 7/00 398/58 |
| 2003/0051048 | A1* | 3/2003 | Watson | H04L 45/00 709/238 |
| 2005/0185586 | A1* | 8/2005 | Nakahira | H04L 1/22 370/237 |
| 2006/0072543 | A1* | 4/2006 | Lloyd | H04L 43/00 370/351 |
| 2007/0121486 | A1* | 5/2007 | Guichard | H04L 45/02 370/216 |
| 2015/0063802 | A1* | 3/2015 | Bahadur | H04L 47/125 398/49 |
| 2016/0352650 | A1* | 12/2016 | Liu | H04L 45/26 |
| 2017/0012895 | A1* | 1/2017 | Zhao | H04L 47/724 |

FOREIGN PATENT DOCUMENTS

| CN | 106209559 A | 12/2016 |
|---|---|---|
| WO | 2015127892 A1 | 9/2015 |

OTHER PUBLICATIONS

Machine Translation and Abstract of Chinese Publication No. CN106209559, Dec. 7, 2016, 44 pages.

(Continued)

*Primary Examiner* — Jamaal Henson
(74) *Attorney, Agent, or Firm* — Conley Rose, P.C.

(57) ABSTRACT

A method is provided to establish a path in an optical domain to couple first and second IP routing domains for use by a VPN. A network controller (NC) receives an optical path setup command and, in response, determines an optical path ID identifying an optical path. The NC sends a mapping command to a domain controller (DC) associated with the first IP routing domain and receives routing information that includes a VPN label. The NC sends a forwarding command including the routing information to a DC associated with the second IP routing domain, the forwarding command configured to cause a termination point in the second IP routing domain to forward a packet to the optical path when the packet comprises elements of the routing information.

20 Claims, 6 Drawing Sheets

(56) References Cited

OTHER PUBLICATIONS

Foreign Communication From a Counterpart Application, PCT Application No. PCT/CN2019/081639, English Translation of International Search Report dated Jun. 6, 2019, 5 pages.
Foreign Communication From a Counterpart Application, PCT Application No. PCT/CN2019/081639, English Translation of Written Opinion dated Jun. 6, 2019, 4 pages.
Jain, et al., "Yang Data Model for BGP/MPLS L3 VPNs," draft-dhjain-bess-bgp-l3vpn-yang-02.txt, Aug. 19, 2016, 29 pages.
Ceccarelli (Ed.), et al., "Framework for Abstraction and Control of Traffic Engineered Networks," draft-ietf-teas-actn-framework-11, Oct. 27, 2017, 37 pages.
Lee, (Ed.), et al., "YANG models for ACTN TE Performance Monitoring Telemetry and Network Autonomics," draft-lee-teas-actn-pm-telemetry-autonomics-05, Oct. 30, 2017, 28 pages.
Lee, (Ed.), et al., "A Yang Data Model for ACTN VN Operation," draft-lee-teas-actn-vn-yang-09, Feb. 22, 2018, 51 pages.
Lee, et al., "Traffic Engineering and Service Mapping Yang Model," draft-lee-teas-te-service-mapping-yang-05, Feb. 22, 2018, 17 pages.
Rose, et al., "BGP/MPLS IP Virtual Private Networks (VPNs)," RFC 4364, Feb. 2006, 47 pages.
Litkowski, et al., "YANG Data Model for L3VPN Service Delivery," RFC 8049, Feb. 2017, 157 pages.

* cited by examiner

PACKET AND OPTICAL INTEGRATION

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Traffic Engineered (TE) networks have a variety of mechanisms to facilitate the separation of the data plane and control plane. They also have a range of management and provisioning protocols to configure and activate network resources. These mechanisms provide technologies for enabling flexible and dynamic networking. Abstraction of network resources is a technique that can be applied to a single network domain or across multiple domains to create a virtualized network that is under the control of a network operator or the customer of the operator that actually owns the network resources.

Abstraction and Control of Traffic Engineered Networks (ACTN) describes a set of management and control functions used to operate one or more TE networks to construct virtual networks that can be represented to customers and that are built from abstractions of the underlying TE networks so that, for example, a link in the customer's network is constructed from a path or collection of paths in the underlying networks.

SUMMARY

In an embodiment, the disclosure includes a method for establishing a path in an optical domain to couple first and second Internet Protocol (IP) routing domains for use by a Virtual Private Network (VPN). The method includes receiving at a network controller (NC) an optical path setup command comprising an indication to establish an optical path in an optical domain between first and second Customer Equipment (CE) respectively coupled to first and second termination points (TPs), the optical path coupling the first and second TPs, the optical path setup command comprising an IP address of the first CE; determining an optical path identifier (ID) in response to the optical path setup command, the optical path ID identifying the optical path, the optical path coupling a first router in a first IP routing domain to a second router in a second IP routing domain, the first router coupled to the first TP and the second router coupled to the second TP; sending a mapping command to a first domain controller (DC) associated with the first IP routing domain, the mapping command comprising the optical path ID and an IP address of the first CE; receiving from the first DC routing information comprising a first association comprising the IP address of the first CE, a VPN label, and the optical path ID; and sending a forwarding command to a second DC associated with the second IP routing domain, the forwarding command comprising the routing information received from the first DC, the forwarding command configured to cause the second TP to forward packets to the optical path identified by the optical path ID when the packets comprise the IP address of the first CE and the VPN label.

Optionally, in any of the preceding aspects, another implementation of the aspect provides the routing information received from the first DC further comprises a VPN label of the optical path. Optionally, in any of the preceding aspects, another implementation of the aspect provides the optical path ID comprises a Traffic Engineering (TE) label. Optionally, in any of the preceding aspects, another implementation of the aspect provides determining the optical path ID of the optical path includes sending from the NC an optical path creation command to an optical domain controller (ODC) associated with the optical domain, the optical path creation command configured to cause the ODC to establish the optical path coupling the first router to the second router; and receiving from the ODC the optical path ID, the optical path ID identifying the optical path established by the ODC in response to the optical path creation command. Optionally, in any of the preceding aspects, another implementation of the aspect provides determining the optical path ID of the optical path comprises identifying an existing optical path coupling the first router in the first IP routing domain to the second router in the second IP routing domain, wherein the optical path ID comprises an identifier of the existing optical path. Optionally, in any of the preceding aspects, another implementation of the aspect provides the optical path setup command further comprises an IP address of a third CE coupled to the first TP, and an indication that the optical path is a shared optical path between the first and second CEs and the second and third CEs; the mapping command further comprises the IP address of the third CE; the routing information further comprising a second association comprising the IP address of the third CE and the optical path ID; and the forwarding command is further configured to cause the second TP to forward packets comprising the IP address of the third CE to the optical path identified by the optical path ID. Optionally, in any of the preceding aspects, another implementation of the aspect provides the mapping command further comprises a first TE label associated with the IP address of the first CE and a second TE label associated with the IP address of the third CE; the first association further comprises the first TE label and the second association further comprises the second TE label; and the forwarding command is further configured to cause the second TP to label packets comprising the IP address of the first CE with the first TE label and to label packets comprising the IP address of the third CE with the second TE label. Optionally, in any of the preceding aspects, another implementation of the aspect provides the first association further comprises a first VPN label and the second association further comprises a second VPN label; and the forwarding command is further configured to cause the second TP to label packets comprising the IP address of the first CE with the first VPN label and to label packets comprising the IP address of the third CE with the second VPN label. Optionally, in any of the preceding aspects, another implementation of the aspect provides sending from the NC an optical path creation command to an optical domain controller (ODC) associated with the optical domain, the optical path creation command configured to cause the ODC to establish the optical path coupling the first router to the second router; and receiving from the ODC the optical path ID, the optical path ID identifying the optical path established by the ODC in response to the optical path creation command. Optionally, in any of the preceding aspects, another implementation of the aspect provides determining the optical path ID of the optical path comprises identifying an existing optical path coupling the first router in the first IP routing domain to the second router in the second IP routing domain, wherein the optical path ID comprises an identifier of the existing optical path.

In an embodiment, the disclosure includes a network node in a communication network comprising a memory configured to store instructions and a processor coupled to the memory and configured to execute the instructions to receive an optical path setup command comprising an indication to establish an optical path in an optical domain of the communication network between first and second Consumer Equipment (CE), respectively coupled to first and second termination points (TPs), the optical path coupling the first and second TPs, the optical path setup command comprising an Internet Protocol (IP) address of the first CE; determine an optical path identifier (ID) in response to the optical path setup command, the optical path ID identifying the optical path, the optical path coupling a first router in a first IP routing domain of the communication network to a second router in a second IP routing domain of the communication network, the first router coupled to the first TP and the second router coupled to the second TP; send a mapping command to a first domain controller (DC) associated with the first IP routing domain, the mapping command comprising the optical path ID and an IP address of the first CE; receive from the first DC routing information comprising a first association comprising the IP address of the first CE and the optical path ID; send a forwarding command to a second DC associated with the second IP routing domain, the forwarding command comprising the routing information received from the first DC, the forwarding command configured to cause the second TP to forward packets comprising the IP address of the first CE to the optical path identified by the optical path ID.

Optionally, in any of the preceding aspects, another implementation of the aspect provides the routing information received from the first DC further comprises a Virtual Private Network (VPN) label of the optical path. Optionally, in any of the preceding aspects, another implementation of the aspect provides the optical path ID comprises a Traffic Engineering (TE) label. Optionally, in any of the preceding aspects, another implementation of the aspect provides the processor is further configured to send an optical path creation command to an optical domain controller (ODC) associated with the optical domain, the optical path creation command configured to cause the ODC to establish the optical path coupling the first router to the second router; and receive from the ODC the optical path ID, the optical path ID identifying the optical path established by the ODC in response to the optical path creation command. Optionally, in any of the preceding aspects, another implementation of the aspect provides the processor is further configured to execute the instructions to determine the optical path ID of the optical path by identifying an existing optical path coupling the first router in the first IP routing domain to the second router in the second IP routing domain, wherein the optical path ID comprises an identifier of the existing optical path. Optionally, in any of the preceding aspects, another implementation of the aspect provides the optical path setup command further comprises an IP address of a third CE coupled to the first TP, and an indication that the optical path is a shared optical path between the first and second CEs and the second and third CEs; the mapping command further comprises the IP address of the third CE; the routing information further comprising a second association comprising the IP address of the third CE and the optical path ID; and the forwarding command is further configured to cause the second TP to forward packets comprising the IP address of the third CE to the optical path identified by the optical path ID. Optionally, in any of the preceding aspects, another implementation of the aspect provides the mapping command further comprises a first TE label associated with the IP address of the first CE and a second TE label associated with the IP address of the third CE; the first association further comprises the first TE label and the second association further comprises the second TE label; and the forwarding command is further configured to cause the second TP to label packets comprising the IP address of the first CE with the first TE label and to label packets comprising the IP address of the third CE with the second TE label. Optionally, in any of the preceding aspects, another implementation of the aspect provides the first association further comprises a first VPN label and the second association further comprises a second VPN label; and the forwarding command is further configured to cause the second TP to label packets comprising the IP address of the first CE with the first VPN label and to label packets comprising the IP address of the third CE with the second VPN label. Optionally, in any of the preceding aspects, another implementation of the aspect provides the processor is further configured to send an optical path creation command to an optical domain controller (ODC) associated with the optical domain, the optical path creation command configured to cause the ODC to establish the optical path coupling the first router to the second router; and receive from the ODC the optical path ID, the optical path ID identifying the optical path established by the ODC in response to the optical path creation command. Optionally, in any of the preceding aspects, another implementation of the aspect provides the processor is further configured to execute the instructions to determine the optical path ID of the optical path comprises identifying an existing optical path coupling the first router in the first IP routing domain to the second router in the second IP routing domain, wherein the optical path ID comprises an identifier of the existing optical path.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

A method and system according to the disclosure support a Software Defined Networking (SDN) based orchestration and control mechanism that interfaces multiple entities, such as a Customer Network Controller (CNC), a Service and Network Orchestrator, one or more Multi-Domain Service Coordinators (MDSCs), and an Optical Transport Network Controller. Methods according to the disclosure provide Virtual Private Networks (VPNs) in multiple Autonomous System (AS) environments via Multi-Protocol-Border Gateway Protocol (MP-BGP). The coordination of End-to-End (E2E) TE tunnel provisioning over Internet Protocol/Multi-Protocol Label Switching (IP/MPLS) inter-domain networks factors in optical underlays in order to provide differentiated services for different VPNs. Methods according to the disclosure provide such optical underlays for the inter-AS External BGP (EBGP) Options A, B, and C. Methods according to the disclosure provide automated service and network operations, giving so-called "zero-touch operations" from customer request to multi-domain and multi-layer service provisioning. Both soft shared and hard dedicated optical bypass options are supported.

Disclosed herein are a method and system for an MDSC to receive a request to map an optical transport path to a VPN, send a command to instantiate or reuse an optical path coupling two IP/MPLS networks to satisfy the request, send a command to map the optical path to one or more IP addresses in the destination IP/MPLS network, receive from the destination IP/MPLS network routing information for packets in the VPN, and send the routing information in a forwarding command to the source IP/MPLS network to cause the source IP/MPLS network to route packets in the VPN to the optical path.

Figure 1:
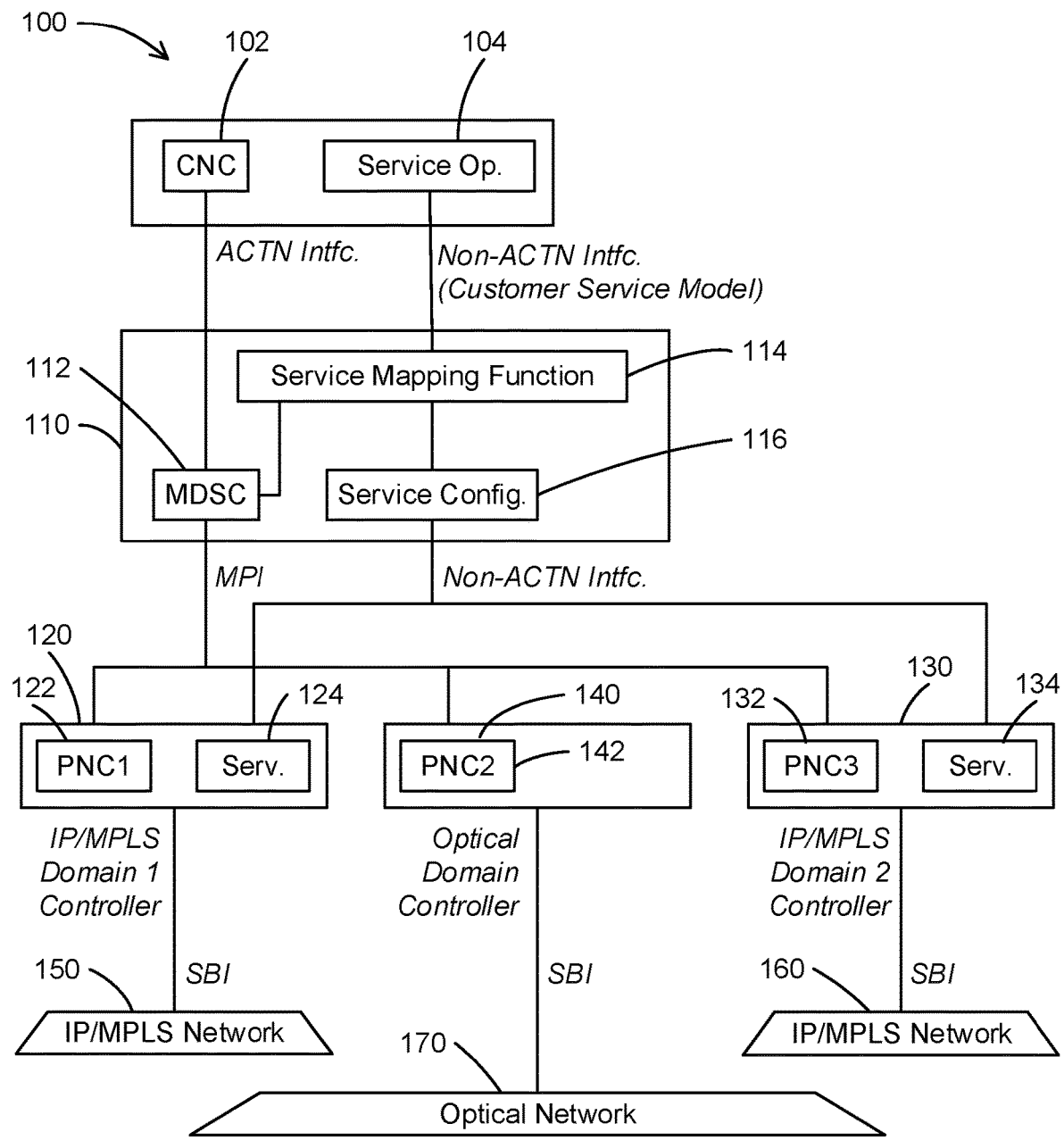
FIG. 1 presents a schematic view of elements of a communication network control system in which packet and optical integration according to the disclosure is provided.

FIG. 1 presents a schematic view of elements of a communication network control system 100 in which packet and optical integration (POI) according to the disclosure is provided. For illustration purposes, a deployment scenario is presented in which ACTN hierarchy is deployed to control a multi-layer and multi-domain network via two IP/MPLS Provisioning Network Controllers (PNCs) and an Optical PNC. The scenario is in the context of an upper layer service configuration (e.g., Layer 3 VPN (L3VPN)) across two AS domains which are transported by one transport underlay (e.g., an Optical Transport Network (OTN)). FIG. 1 shows ACTN components as well as non-ACTN components that are employed for end-to-end service fulfillment according to the disclosure.

The communication network control system 100 includes customer-layer function CNC 102 and Service Optimization function 104; Service/Network Orchestrator 110; Domain Controller (DC) 120 for IP/MPLS Network 150; DC 130 for IP/MPLS Network 160; and DC 140 for Optical Network 170. The Service/Network Orchestrator 110 includes MDSC function 112, Service Mapping function 114, and Service Configuration function 116.

The CNC 102 is communicatively coupled to the MDSC function 112 with CNC-MDSC Interface (CMI), where ACTN Virtual Network (VN) information, TE-topology information, and TE and Service Mapping models are exchanged. The Service Optimization function 104 is communicatively coupled to the Service Mapping function 114 with a Customer Service Model Interface (CSMI), which is a non-ACTN interface, where Layer 3 Service Model (L3SM) information is exchanged.

The MDSC function 112 is communicatively coupled to PNC 122 of the DC 120, PNC 132 of the DC 130, and PNC 142 of the DC 140. The Service Configuration function 116 is communicatively coupled to the Service function 124 of DC 120 and the Service function 134 of the DC 130 with a Service Configuration Interface, which is a non-ACTN interface used to coordinate L3VPN service configuration and to convey service specific information such as VPN information and VPN binding policy (for example, new underlay tunnel creation for isolation). DC 120, DC 130, and DC 140 are communicatively coupled using a co-called "south bound interface" to the IP/MPLS Network 150, the IP/MPLS Network 160, and the Optical Network 170, respectively.

The IP/MPLS Networks 150 and 160 in other embodiments may be any suitable IP routing domain, such as an IP network, an MPLS network, or an MP-BGP network. The MDSC function 112 is one example of a network controller, but in other embodiments the network controller may comprise an SDN controller or an SDN orchestrator. Any of the DCs 120, 130, and 140, and the PNCs 122, 132, and 142 may be referred to as a domain controller.

A customer may employ the CNC 102 and the Service Optimization function 104 to request VPN services using ACTN CMI models and non-ACTN CMI models together. Suitable ACTN CMI models include ACTN VN YANG (Yet Another Next Generation) and TE & Service Mapping YANG. One example of a non-ACTN CMI model is L3SM YANG.

In one example, ACTN VN YANG provides the profile of VN in terms of VN members, each of which corresponds to a mapping of customer end-points (Virtual Network Access Points (VNAPs)) and Link Termination Points (LTPs) of a TE-tunnel for source and destination of the VN member, as well as an associated traffic matrix (e.g., bandwidth, latency, protection level, etc.) of the VN member. An LTP is one example of a termination point, but in other embodiments a termination point may comprise a Provider Edge (PE) access point. The ACTN VN YANG model also provides VN-level policy information. Examples of such policy information include local-reroute policy (delegation), push policy (policy to state whether changes can be pushed to the customer), and update policy (policy to allow only the changes to be reported). The ACTN VN YANG model also provides information such as VN-level admin-status and operational-status.

In another example, the TE & Service Mapping YANG model provides TE-service mapping as well as site mapping. TE-service mapping provides a mapping list of VPNs with their corresponding ACTN VN references and TE tunnel references. The TE-service mapping also provides a mapping policy type regarding how the requested VPN service is created with respect to an underlay TE tunnel (in one example, whether the VPN requires a new and isolated TE underlay tunnel or not).

L3SM YANG provides L3VPN service and site information from a customer service point of view. Site mapping provides site reference information across the L3VPN Site Identifier (ID), the ACTN VNAP ID, and the LTP of the TE tunnel ID. This is useful from an operational standpoint as each of the related YANG models has different terminology that refers to the same concepts.

Figure 2:
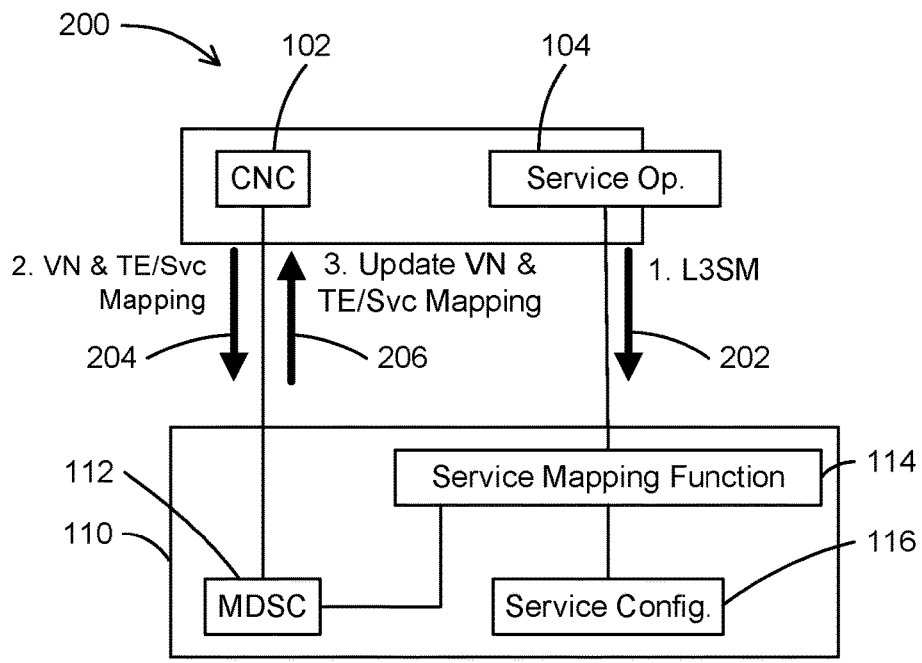
FIG. 2 illustrates an example of signal flows according to the disclosure between some elements of the communication network control system shown in FIG. 1.

FIG. 2 illustrates an example of signal flows 200 according to the disclosure between some elements of the communication network control system 100 shown in FIG. 1. In step 202, the Service Optimization function 104 sends L3SM information to the Service Mapping function 114. In step 204, the CNC 102 sends VN information and TE & Service Mapping information to the MDSC function 112. The information sent in steps 202 and 204 may collectively be referred to as an optical path setup command. In step 206, the MDSC function 112 returns updated VN and TE & Service Mapping information to the CNC 102.

The Service/Network Orchestrator 110 interfaces with the customer and decouples the service controller functions of the MDSC function 112 from the service functions of the Service Mapping function 114 and the Service Configuration function 116. As disclosed herein, a single Service/Network Orchestrator 110 orchestrates network and service functions for two IP domains and one optical domain. In other embodiments, service/network orchestration can form a hierarchy, with a top-level orchestrator interfacing two low-level orchestrators, one for IP/MPLS network control and the other for Optical network control.

One service function the Service/Network Orchestrator 110 performs for L3VPN is to identify its TE binding policy (from TE & Service Mapping Model) and relay the policy to IP/MPLS DCs 120 and 130 via a non-ACTN interface to cause a proper IP/Virtual Routing and Forwarding (VRF) forwarding table to be populated according to the TE binding policy for the VPN. Examples of TE binding policy include new VN/tunnel binding, VN/tunnel selection, and VN/tunnel modification.

New VN/Tunnel Binding is a first example of a TE binding policy. A customer may request an L3VPN service with a new VN/Tunnel that is dedicated to the requested VPN (that is, which is not shared with other VPNs). This may be done to meet VPN isolation requirement. In response to such a request, the optical server layer creates a new optical layer tunnel. Once the new optical layer tunnel is created, its optical path ID is updated as the TE tunnel in the client layer, for example, in the IP/MPLS layer. This newly created optical TE tunnel is dedicated to the requested VPN with the dedicated VN/Tunnel policy requirement.

VN/Tunnel Selection is a second example of a TE binding policy. A customer may request an L3VPN service, and responding to the accompanying CMI model, one or more domain controllers configure network elements to deliver the requested service. Each network element selects a tunnel based on the CMI model. Where new tunnels (or VNs) are not needed for each VPN, the tunnels can be shared across multiple VPNs. A mapping YANG model is used to get the mapping between the L3VPN and the tunnels in use. The VN/Tunnel Selection binding policy does not include modifying existing tunnels.

VN/Tunnel Modify is a third example of a TE binding policy. This binding policy allows the modification of the properties of a selected, existing VN/tunnel (for example, a change in tunnel bandwidth) when a new VPN is created.

When a new VN/Tunnel Binding policy is applied for a VPN, a new optical layer tunnel is first created dynamically, followed by an IP/MPLS VRF configuration process to cause forwarding of the VPN to the newly created optical tunnel. The configuration process includes various control level mechanisms. First, The MDSC function 112 (or other network controller) identifies a domain sequence in the IP/MPLS layer in which the VPN needs to be forwarded. Next, the MDSC function 112 identifies the optical underlay domain(s) for the IP/MPLS layer domains. Finally, the MDSC function 112 identifies any inter-layer peering points in both IP/MPLS domains and the optical domain. The configuration process results in the VPN being forwarded to a tunnel that starts at an ingress PE (in one domain) and terminates at an egress PE (in another domain) via the underlay optical tunnel.

For purposes of simplicity, this disclosure describes only a single optical domain (optical network 170) that serves multiple IP routing domains (IP/MPLS Network 150 and IP/MPLS Network 160). Other embodiments may include a plurality of optical domains servicing one or more IP routing domains.

Figure 3:
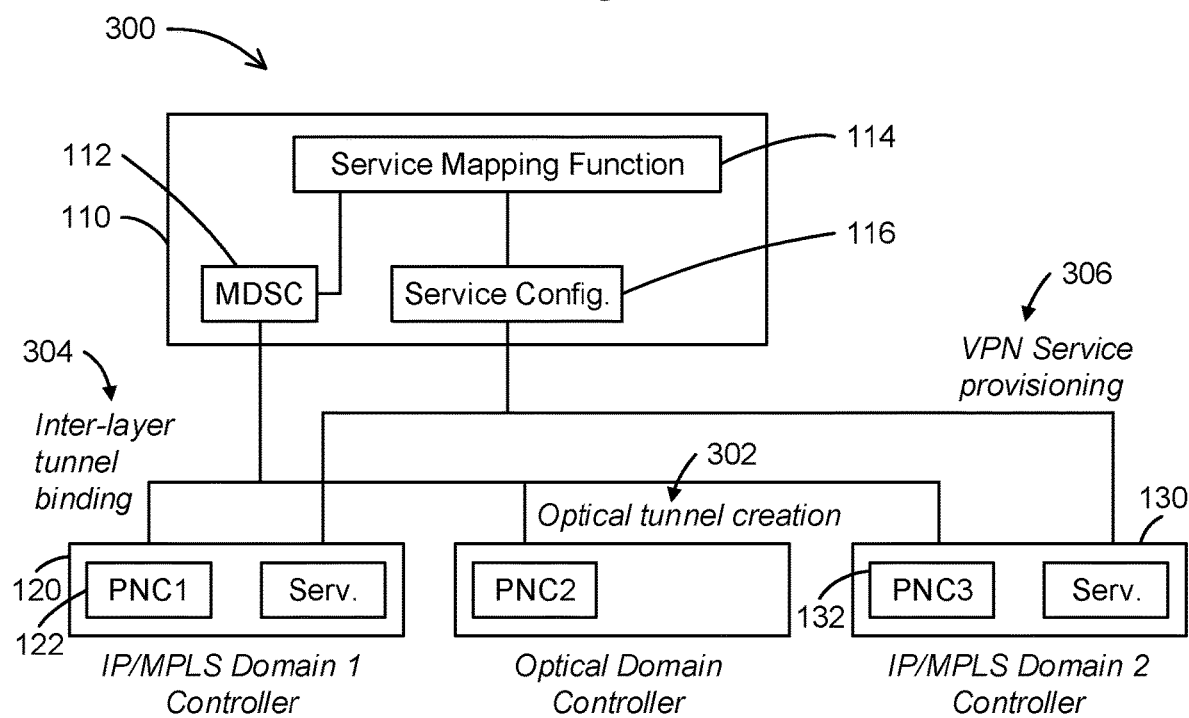
FIG. 3 illustrates an example of further signal flows according to the disclosure between some elements of the communication network control system shown in FIG. 1.

FIG. 3 illustrates an example of further signal flows 300 according to the disclosure between some elements of the communication network control system 100 shown in FIG. 1 for establishing an optical path (or tunnel) for a VPN. In step 302 (optical tunnel provisioning), the MDSC function 112 of the Service/Network Orchestrator 110 determines an optical path ID (e.g., a TE-Tunnel ID or TE-label) for the optical ingress and egress. In the case of new VN/Tunnel Binding, the optical path ID is determined by instantiating an optical TE tunnel. In the cases of VN/Tunnel Selection or VN/Tunnel Modify, the optical path ID is determined from an optical TE tunnel in use.

Once the optical path ID is determined, the MDSC function 112 of the Service/Network Orchestrator 110, in step 304 (inter-layer tunnel binding), coordinates with the PNC functions 122 and 132 of the DCs 120 and 130, respectively, to bind the optical path ID to the VPN label that has requested use of the optical path. The MDSC function 112 sends a mapping command to the PNC 132. The mapping command includes the optical path ID and an IP address of a first Customer Equipment (CE) device (destination CE or, simply, "first CE") coupled to IP/MPLS Network 160. The mapping command is configured to associate the first CE with the optical path ID. In response, the PNC 132 sends the MDSC function 112 routing information that comprises information associating the IP address of the first CE, the VPN label, and the optical path ID. In response to receiving the routing information, the MDSC function 112 sends a forwarding command to the PNC 122. The forwarding command includes at least the routing information received from the PNC 132.

In step 306 (VPN service provisioning), the Service Mapping function 114 and the Service Configuration function 116 of the Service/Network Orchestrator 110 identify interfaces and labels on both ingress and egress inter-layer peering points for the tunnel created for the VPN and convey this information to the DCs 120 and 130 and to the optical DC 140 for subsequent actions in their domain networks. As part of performing this step, the forwarding command sent in step 304 is configured to cause the IP/MPLS Network 150 to forward packets to the optical path identified by the optical path ID, where the packets are received at the ingress PE from a second CE device (source CE or, simply, "second CE") and comprise the IP address of the first CE and the VPN label.

The DC 120 sends a VRF instruction to the ingress PE in IP/MPLS Network 150. The VRF instruction includes a VPN ID, an MPLS label, and an interlayer interface ID (optical path ID). This populates the ingress PE's VRF table so that packets in the VPN are forwarded to the inter-layer optical interface and are labeled with the VPN label. The ingress PE "relays" the VPN label to the inter-layer interface. The node in the optical network 170 that receives the VPN packets from the ingress PE recognizes the VPN label on its ingress interface (client side) and cross-connects to its outgoing interface (networks side).

The DC 130 sends information including the interlayer interface ID (optical path ID) for the VPN to the egress PE (which is BGP next hop). This information is configured to create a VRF forwarding rule for the egress PE for the VPN. When a packet with the VPN label arrives at the egress PE from the interlayer interface, per the VRF forwarding rule, the egress PE removes the VPN label that was carried over the inter-layer interface and sends the packet to the destination CE.

Figure 4:
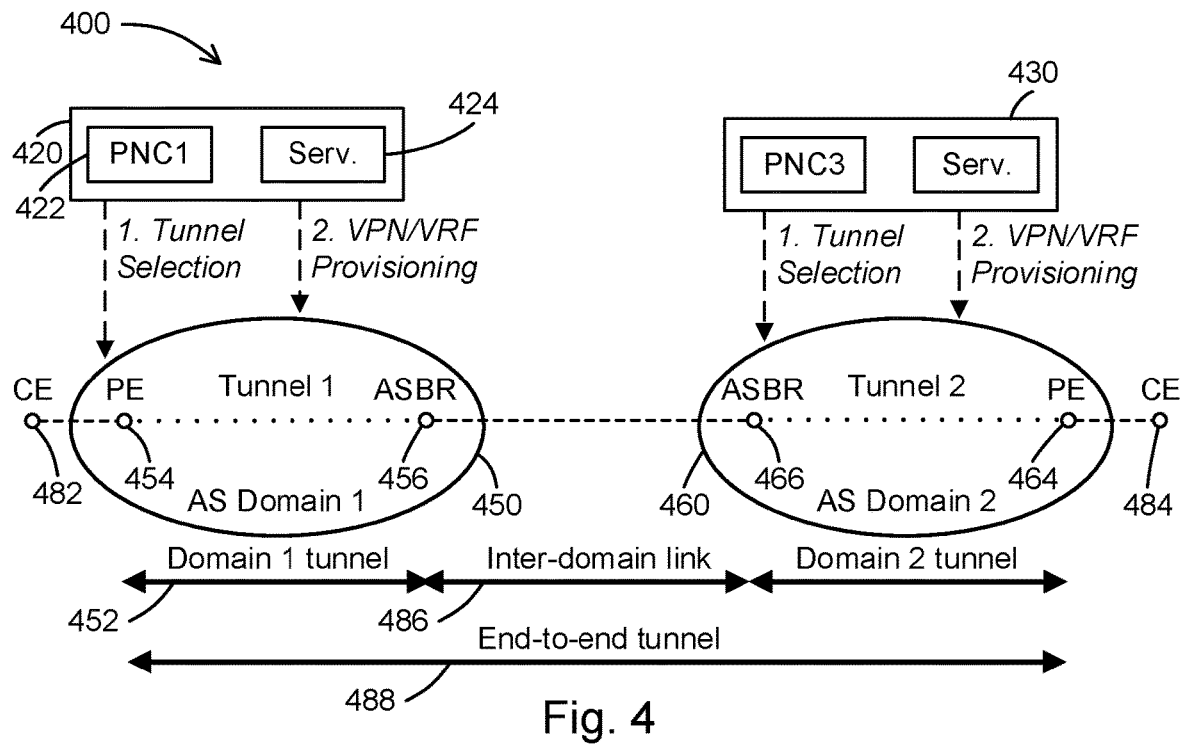
FIG. 4 presents a system of network elements, domains, tunnels, and inter-domain links according to one embodiment of the disclosure.

FIG. 4 presents a system 400 of network elements, domains, tunnels, and inter-domain links according to one embodiment of the disclosure. The system 400 includes DCs 420 and 430 for IP/MPLS Networks 450 and 460, respectively, which are AS domains. In the deployment scenario presented in FIG. 4, the requested VPN does not require a new tunnel, so an existing tunnel may be selected for use by the VPN—either with or without tunnel property changes (Domain Tunnel Selection or Domain Tunnel Modification). In this deployment scenario, there is no need for creating a dynamic optical tunnel.

MP-BGP is running in IP/MPLS Networks 450 and 460. A VPN label of a requested VPN is made known to Autonomous System Boundary Routers (ASBRs) 456 and 466 and PE devices 454 and 464 in the IP/MPLS Networks 450 and 460, respectively, via a mechanism such as Internal-Border Gateway Protocol (I-BGP) for intra-domain provisioning and EBGP for inter-domain provisioning. The DCs 420 and 430 provide several functions to facilitate tunnel selection for a VPN at both the domain level and the end-to-end level.

In the embodiment shown in FIG. 4, Domain Tunnel Selection is described. The DC 420 selects a domain level tunnel in the IP/MPLS Network 450 for the VPN. First the DC 420 determines which existing tunnels fulfill the VPN requirements allotted by the Service/Network Orchestrator (not shown in FIG. 4) to the domain of the DC 420 (for example, bandwidth, latency, or other requirements). Where at least one tunnel satisfies the VPN requirements, the DC 420 selects tunnel 452 from the candidate pool.

Once the DC 420 selects domain level tunnel 452, a Service function 424 of the DC 420 maps the VPN to the tunnel interface and assigns a label (for example, an MPLS label) for the VPN to an associated PE device 454 in the IP/MPLS Network 450. Then the PE device 454 creates a new entry for the VPN in the VRF forwarding table so that when a VPN packet arrives, the PE device 454 will be able to direct the packet to the correct interface and add the label assigned for the VPN.

An ASBR 456 of the IP/MPLS Network 450 that interfaces to a next domain keeps the VPN label intact when a packet is forwarded to ASBR 466 of the next domain so that the ASBR 466 sees the VPN packets as if they are coming from the source CE 482. The ASBR 466 performs the same procedure that includes VPN/VRF tunnel mapping and interface/label assignment with its IP/MPLS domain controller.

Where additional domains exist between the IP/MPLS Networks 450 and 460 (not shown in FIG. 4), the above process is repeated in each such intervening domain. PE device 464 of the last IP/MPLS Network 460, which interfaces to a destination CE 484, recognizes the VPN label when a VPN packet arrives and, in response, POPs the VPN label and forwards the packets to the destination CE 484.

An inter-domain optical tunnel 486 for the VPN is determined by the Service/Network Orchestrator, which has information on available inter-domain links, their status, and their resource information (e.g., bandwidth available, protection/restoration policy, etc.). The Service/Network Orchestrator may create the inter-domain optical tunnel 486 or may select the optical tunnel 486 from existing optical tunnels. The Service/Network Orchestrator informs the DCs 420 and 430 of the inter-domain optical tunnel 486. The DCs 420 and 430, in turn, inform ASBRs 456 and 466, respectively, of the inter-domain optical tunnel 486 and ASBR 456 is instructed to forward packets including the VPN label to the inter-domain optical tunnel 486. Thus, the Service/Network Orchestrator controls and manages end-to-end tunnel 488 for the requested VPN per VPN policy. Furthermore, the Service/Network Orchestrator collects and reports end-to-end tunnel 488 performance monitoring information to the customer requesting the VPN.

Figure 5:
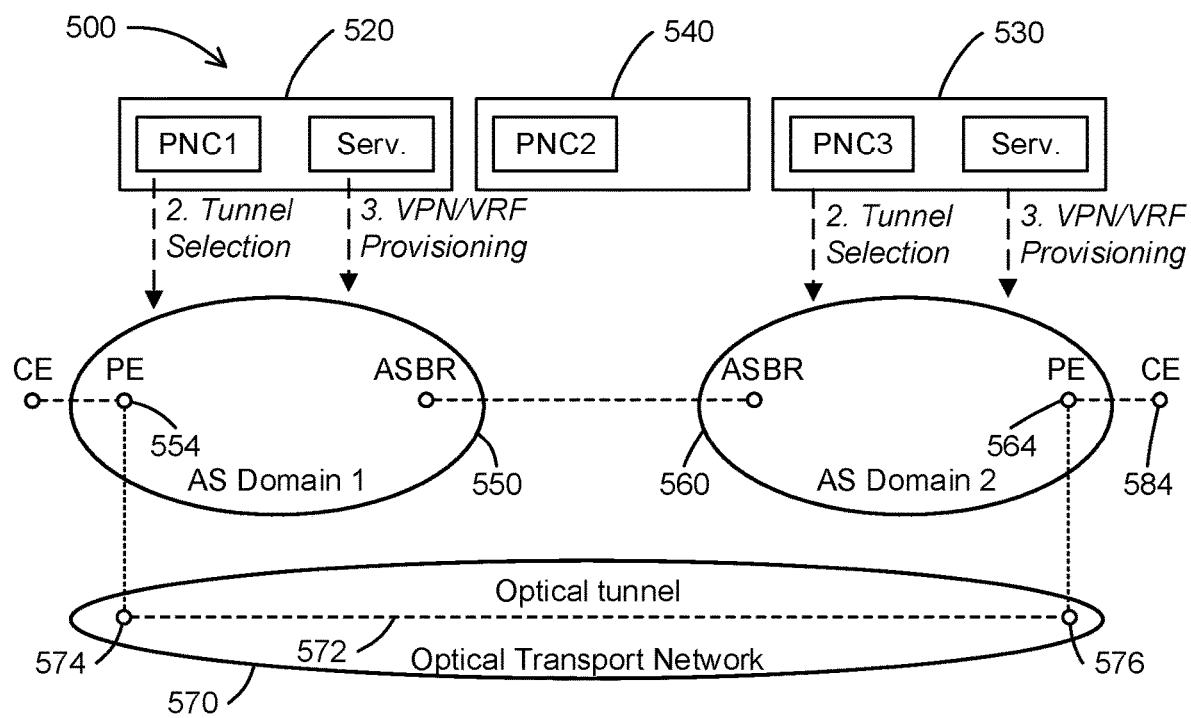
FIG. 5 presents a system of network elements, domains, tunnels, and inter-domain links according to another embodiment of the disclosure.

FIG. 5 presents a system 500 of network elements, domains, tunnels, and inter-domain links according to another embodiment of the disclosure. The system 500 includes DCs 520 and 530 for IP/MPLS Networks 550 and 560, respectively, and DC 540 for OTN 570. The OTN 570 provides underlay connectivity services to IP/MPLS networks 550 and 560. In other embodiments, two IP/MPLS domains may be interconnected by more than one optical network domain. In still other embodiments, an optical domain may interconnect more than two IP/MPLS domains. Coordination of multiple layers and multiple domains is provided by a Service/Network Orchestrator (not shown in FIG. 5). FIG. 5 illustrates a scenario in which a requested VPN has a policy for new tunnel/VN binding, where the Service/Network Orchestrator coordinates across DCs 520, 530, and 540 to ensure the creation of a new optical tunnel 572 for the VPN.

Once the optical tunnel 572 has been created, the DC 520 maps the VPN to an optical path ID for the optical tunnel 572 and assigns a label (for example, an MPLS label) for the VPN to an associated PE 554 in the IP/MPLS Network 450. Then the PE 554 creates a new entry for the VPN in the VRF forwarding table so that when a VPN packet arrives, the PE 554 will be able to recognize the VPN label on its ingress interface. The PE554 than adds the Optical channel Data Unit (ODU) label on top of the VPN label on its outgoing network interface and directs the packet to an ingress node 574 of the optical tunnel 572.

The Service/Network Orchestrator sends information to the DC 540 configured to cause an egress optical domain PE 576 to POP the ODU label before sending the VPN packet (with VPN label intact at the top level) to an egress PE 564 in the IP/MPLS network 560. The PE 564, which interfaces to a destination CE 584, is configured by the DC 530 to recognize the VPN label when a VPN packet arrives and, in response, POP the VPN label and forward the packets to the destination CE 484.

Figure 6:
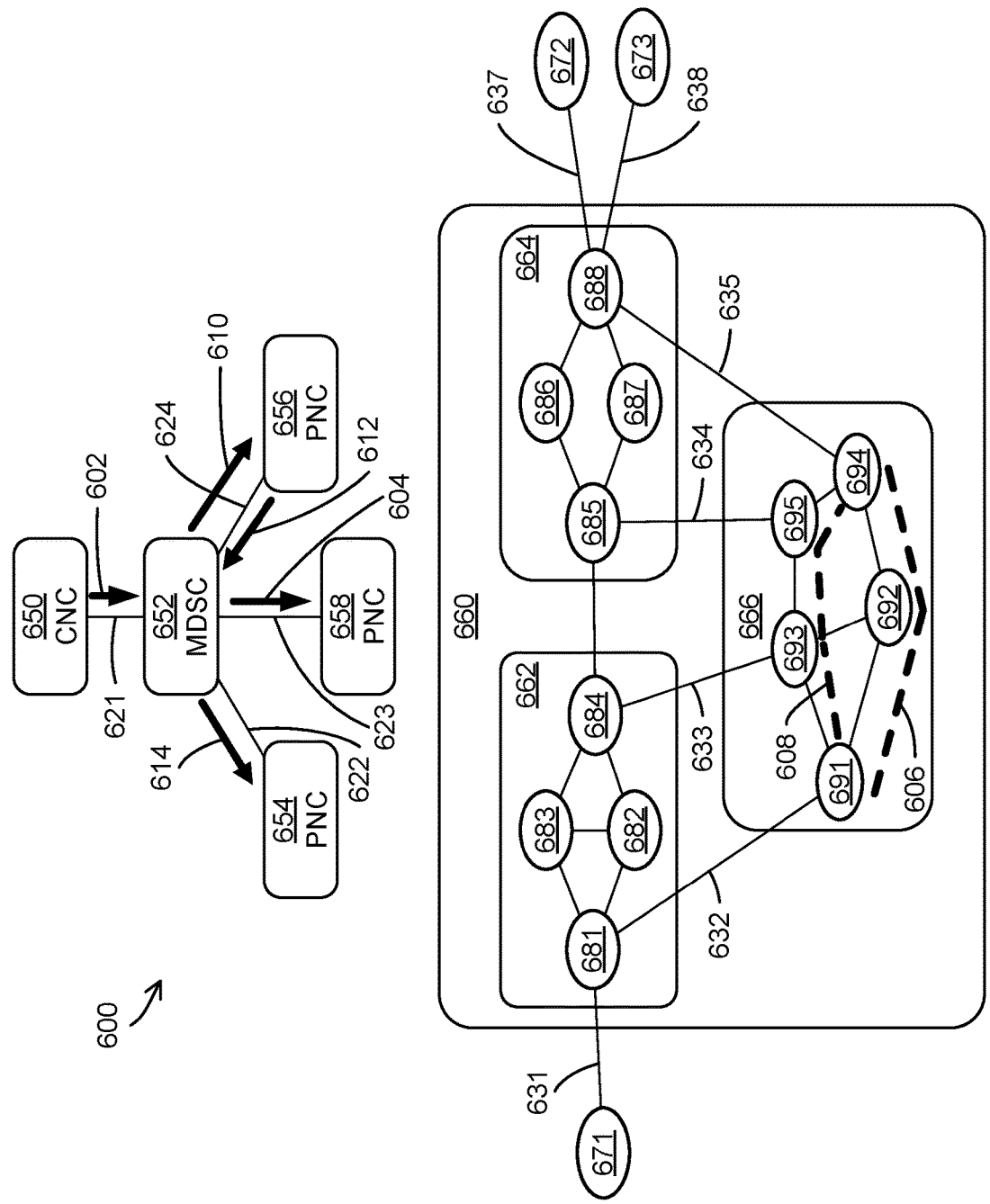
FIG. 6 presents a schematic view of a communication network with signal flows illustrating a method according to the disclosure.

FIG. 6 presents a schematic view of a communication network 600 with signal flows illustrating a method according to the disclosure. The communication network 600 includes control element CNC 650 coupled to MDSC 652 by communication link 621. The communication network 600 further includes DCs 654, 656, and 658, coupled via communication links 622, 624, and 623, respectively, to the MDSC 652. The communication links 622, 623, and 624 may be wired, wireless, or optical links.

The communication network 600 also includes a network 660 of communication devices coupled to CEs 671, 672, and 673 by communication links 631, 637, and 638. The communication links 631, 637, and 638 may be wired, wireless, or optical links. The network 660 includes IP routing domains 662 and 664 and optical transport network 666. The IP routing domain 662 includes routers 681, 682, 683, and 684, which are coupled via various communication links that may be wired, wireless, or optical links. Similarly, the IP routing domain 664 includes routers 685, 686, 687, and 688, which are coupled via various communication links that may be wired, wireless, or optical links. The optical transport network 666 includes optical nodes 691, 692, 693, 694, and 695, which are coupled via various optical communication links.

The CE 671 is coupled to the router 681 by a communication link 631. The router 681 is coupled to the optical node 691 by a communication link 632. The router 684 is coupled to the optical node 693 by a communication link 633. The router 685 is coupled to the optical node 695 by a communication link 634. The router 688 is coupled to the optical node 694 by a communication link 635. The CEs 672 and 673 are coupled to the router 688 by communication links 637 and 638, respectively. The communication links 631 through 638 may be wired, wireless, or optical links.

The DC 654 provides network and service functions for the IP routing domain 662 via communication links not shown in FIG. 6. The DC 656 provides network and service functions for the IP routing domain 664 via communication links not shown in FIG. 6. The DC 658 provides network and service functions for the optical transport network 666 via communication links not shown in FIG. 6.

In step 602, an optical path setup command is received by the MDSC 652 from the CNC 650. The optical path setup command requests an optical path for use by a VPN, identified by a VPN label, and includes path requirements. The optical path setup command also includes IP addresses of a source CE (CE 671) and a destination CE (CE 672). The optical path setup command further includes an identifier of a source TP (router 681) in a source IP routing domain (IP routing domain 662), as well as a destination TP (router 688) in a destination IP routing domain (IP routing domain 664).

If the optical path setup command indicates that the requested optical path may be shared with other VPNs, in step 604, the MDSC 652 communicates with the DC 658 to determine whether an existing optical path meets the path requirements. If an existing optical path is found, the DC 658 returns an optical path ID for the existing optical path to the MDSC 652.

If the optical path setup command indicates that the requested optical path is to be dedicated to the requesting VPN, in step 604, the MDSC 652 sends the DC 658 an optical path creation command that includes the path requirements. Upon completion of the command, the DC 658 returns to the MDSC 652 an optical path ID of the newly established, dedicated optical path.

Whether shared or dedicated, the requested optical path couples the router 681 (the source TP) to the router 688 (the destination TP) and provides communication between the CE 671 (the source CE) and the CE 672 (the destination CE). In a first example, optical path 606 extends from optical node 691 to optical node 692 to optical node 694. In a second example, optical path 608 extends from optical node 691 to optical node 693 to optical node 695 to optical node 694. The optical path ID may identify either optical path 606 or 608.

In step 610, the MDSC 652 sends a mapping command to the DC 656. The mapping command includes the optical path ID and the IP address of the CE 672. The DC 656 associates the optical path ID, the IP address of CE 672, and the VPN label and, in step 612, returns to the MDSC 652 routing information that includes the association.

In step 614, the MDSC 652 sends a forwarding command to the DC 654. The forwarding command includes the routing information received by the MDSC 652 from the DC 656. The forwarding command is configured to cause the router 681, based on the routing information, to forward to the optical path identified by the optical path ID packets that include the IP address of the CE 672 and the VPN label.

In a first scenario, the sequence of mapping command, routing information, and forwarding command described with reference to FIG. 6 may be used where a single VPN label is used for communication on a newly instantiated optical path 606 dedicated to communications between the CE 671 and the CE 672.

In a second scenario, a second optical path 608 is dedicated to communications between the CE 671 and the CE 673, using a single VPN label for communications over both optical paths 606 and 608. In such a second scenario, the mapping command and routing information may comprise additional information. The mapping command additionally includes the IP address of the CE 673 and is further configured to associate the CE 673 with a second optical path ID of the optical path 608. The routing information additionally includes information associating the IP address of the CE 673, the VPN label, and the second optical path ID.

In a third scenario, the optical path 606 is shared for communications between the CE 671 and the CE 672 and for communications between the CE 671 and the CE 673, and a single VPN label is used. In such a third scenario, the mapping command and routing information may comprise additional information. The mapping command additionally includes the IP address of the CE 673 and is further configured to associate the CE 673 with the optical path ID of optical path 606. The routing information additionally includes information associating the IP address of the CE 673, the VPN label, and the optical path ID of optical path 606.

In a fourth scenario, the optical path 606 is again shared for communications between the CE 671 and the CE 672 and for communications between the CE 671 and the CE 673, and a single VPN label is again used. In such a fourth scenario, first and second TE-Tunnel IDs are assigned to the CE 672 and the CE 673, respectively, by the MDSC. The mapping command additionally includes the first and second TE-Tunnel IDs and the IP address of the CE 673. The mapping command is further configured to associate the IP address of the CE 672 with the first TE-Tunnel ID and the optical path ID of optical path 606 and to associate the IP address of the CE 673 with the second TE-Tunnel ID and the optical path ID of optical path 606.

In such a fourth scenario, the routing information includes information associating the IP address of the CE 672, the VPN label, and the first TE-Tunnel ID, as well as information associating the IP address of the CE 673, the VPN label, and the second TE-Tunnel ID. The routing information further includes information associating the first TE-Tunnel ID with a first TE-label and the optical path ID of optical path 606, as well as information associating the second TE-Tunnel ID with a second TE-label and the optical path ID of optical path 606.

Figure 7:
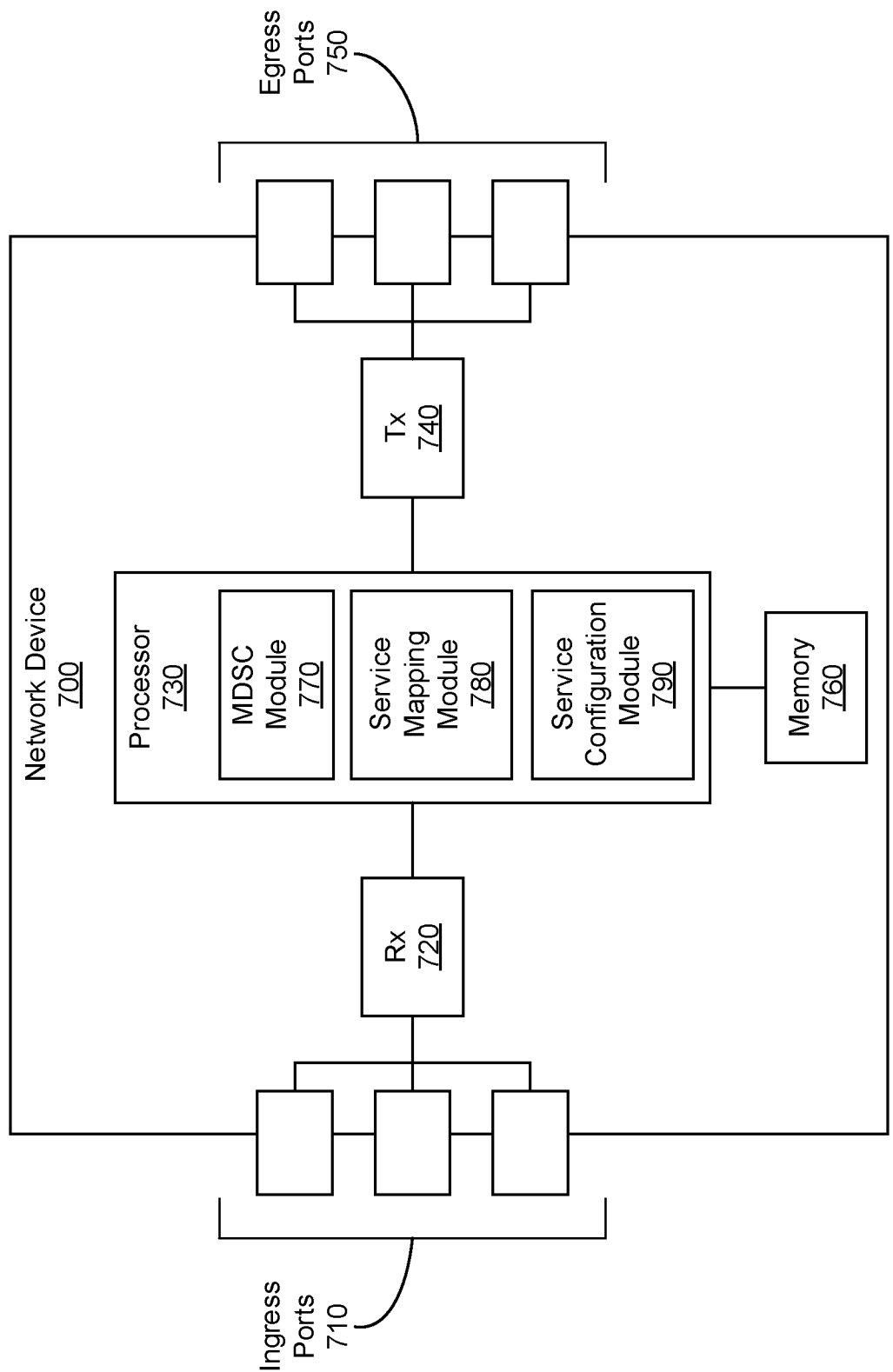
FIG. 7 shows a schematic diagram of a network device according to an embodiment of the disclosure.

FIG. 7 is a schematic diagram of a network device 700 (e.g., Service/Network Orchestrator 110, or DCs 120, 130, or 140) according to an embodiment of the disclosure. The network device 700 is suitable for implementing the disclosed embodiments as described herein. In an embodiment, the network device 700 may be a decoder or an encoder. The network device 700 comprises ingress ports 710 and receiver units (Rx) 720 for receiving data; a processor, logic unit, or central processing unit (CPU) 730 to process the data; transmitter units (Tx) 740 and egress ports 750 for transmitting the data; and a memory 760 for storing the data. The network device 700 may also comprise optical-to-electrical (OE) components and electrical-to-optical (EO) components coupled to the ingress ports 710, the receiver units 720, the transmitter units 740, and/or the egress ports 750 for egress or ingress of optical or electrical signals.

The processor 730 is implemented by hardware and software. The processor 730 may be implemented as one or more CPU chips, cores (e.g., as a multi-core processor), field-programmable gate arrays (FPGAs), application specific integrated circuits (ASICs), and digital signal processors (DSPs). The processor 730 is in communication with the ingress ports 710, the receiver units 720, the transmitter units 740, the egress ports 750, and the memory 760. The processor 730 comprises one or more of MDSC module 770, Service Mapping module (SMM) 780, and/or Service Configuration module (SCM) 790. The MDSC module 770, the SMM 780, and the SCM 790 implement the disclosed embodiments described herein. For instance, the MDSC module 770 configures the processor 730 to perform inter-layer tunnel binding and optical tunnel creation, the SMM 780 configures the processor 730 to receive and process L2SM information, and the SCM 790 configures the processor 730 to perform VPN service provisioning. The inclusion of the MDSC module 770, the SMM 780, and/or the SCM 790 therefore provides a substantial improvement to the functionality of the network device 700 and effects a transformation of the network device 700 to a different state. Alternatively, the MDSC module 770, the SMM 780, and/or the SCM 790 are implemented as instructions stored in the memory 760 and executed by the processor 730.

The memory 760 comprises one or more disks, tape drives, and solid-state drives and may be used as an overflow data storage device, to store programs when such programs are selected for execution, and to store instructions and data that are read during program execution. The memory 760 may be volatile and/or non-volatile and may be read-only memory (ROM), random access memory (RAM), ternary content-addressable memory (TCAM), and/or static random-access memory (SRAM).

Figure 8:
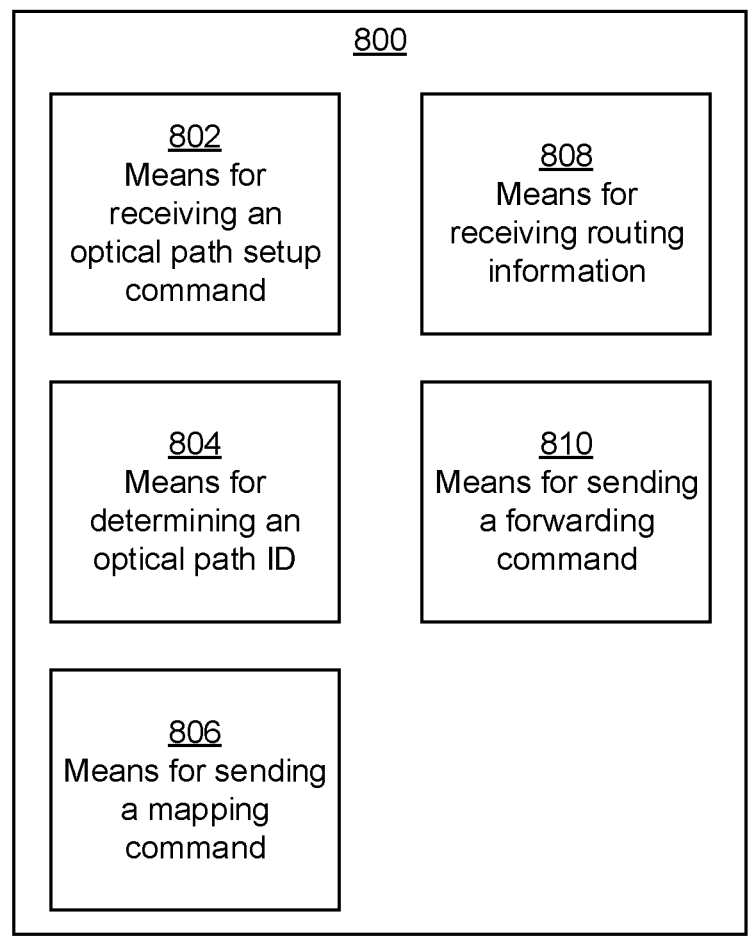
FIG. 8 shows a method according to the disclosure of establishing a path in an optical domain to couple first and second IP routing domains for use by a VPN, implemented in a network controller.

A method according to the disclosure of establishing a path in an optical domain to couple first and second IP routing domains for use by a VPN, implemented in a network controller (NC) 800, as shown in FIG. 8. The method includes a means 802 for receiving at a network controller (NC) an optical path setup command comprising an indication to establish an optical path in an optical domain between first and second Customer Equipment (CE) respectively coupled to first and second termination points (TPs), the optical path coupling the first and second TPs, the optical path setup command comprising an IP address of the first CE; a means 804 for determining an optical path identifier (ID) in response to the optical path setup command, the optical path ID identifying the optical path, the optical path coupling a first router in a first IP routing domain to a second router in a second IP routing domain, the first router coupled to the first TP and the second router coupled to the second TP; a means 806 for sending a mapping command to a first domain controller (DC) associated with the first IP routing domain, the mapping command comprising the optical path ID and an IP address of the first CE; a means 808 for receiving from the first DC routing information comprising a first association comprising the IP address of the first CE, a VPN label, and the optical path ID; and a means 810 for sending a forwarding command to a second DC associated with the second IP routing domain, the forwarding command comprising the routing information received from the first DC, the forwarding command configured to cause the second TP to forward packets to the optical path identified by the optical path ID when the packets comprise the IP address of the first CE and the VPN label.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled may be directly or indirectly coupled or communicating with each other, may be directly or indirectly communicating through some interface, device, or intermediate component whether electrically, mechanically, or otherwise. Where a first element is shown or described as occurring in response to a second element, the first element may occur in direct response or in indirect response to the second element. Other examples of changes, substitutions, and alterations are ascertainable by one skilled in the art and could be made without departing from the spirit and scope disclosed herein.

What is claimed is:

1. A method for establishing a path in an optical domain to couple first and second Internet Protocol (IP) routing domains for use by a Virtual Private Network (VPN), the method comprising:

receiving at a network controller (NC) an optical path setup command comprising an indication to establish an optical path in an optical domain between first and second Customer Equipment (CE) respectively coupled to first and second termination points (TPs), the optical path coupling the first and second TPs, the optical path setup command comprising an IP address of the first CE;

determining an optical path identifier (ID) in response to the optical path setup command, the optical path ID identifying the optical path, the optical path coupling a first router in a first IP routing domain to a second router in a second IP routing domain, the first router coupled to the first TP and the second router coupled to the second TP;

sending a mapping command to a first domain controller (DC) associated with the first IP routing domain, the mapping command comprising the optical path ID and an IP address of the first CE;

receiving from the first DC routing information comprising a first association comprising the IP address of the first CE, a VPN label, and the optical path ID; and sending a forwarding command to a second DC associated with the second IP routing domain, the forwarding command comprising the routing information received from the first DC, the forwarding command configured to cause the second TP to forward a packet to the optical path identified by the optical path ID when the packet comprises the IP address of the first CE and the VPN label.

2. The method of claim 1, wherein the routing information received from the first DC further comprises a VPN label of the optical path.

3. The method of claim 1, wherein the optical path ID comprises a Traffic Engineering (TE) label.

4. The method of claim 1, wherein determining the optical path ID of the optical path comprises:
sending from the NC an optical path creation command to an optical domain controller (ODC) associated with the optical domain, the optical path creation command configured to cause the ODC to establish the optical path coupling the first router to the second router; and
receiving from the ODC the optical path ID, the optical path ID identifying the optical path established by the ODC in response to the optical path creation command.

5. The method of claim 1, wherein determining the optical path ID of the optical path comprises identifying an existing optical path coupling the first router in the first IP routing domain to the second router in the second IP routing domain, wherein the optical path ID comprises an identifier of the existing optical path.

6. The method of claim 1, wherein:
the optical path setup command further comprises an IP address of a third CE coupled to the first TP, and an indication that the optical path is a shared optical path between the first and second CEs and the second and third CEs;
the mapping command further comprises the IP address of the third CE;
the routing information further comprising a second association comprising the IP address of the third CE and the optical path ID; and
the forwarding command is further configured to cause the second TP to forward a packet comprising the IP address of the third CE to the optical path identified by the optical path ID.

7. The method of claim 6, wherein:
the mapping command further comprises a first TE label associated with the IP address of the first CE and a second TE label associated with the IP address of the third CE;
the first association further comprises the first TE label and the second association further comprises the second TE label; and the forwarding command is further configured to cause the second TP to label a packet comprising the IP address of the first CE with the first TE label and to label a packet comprising the IP address of the third CE with the second TE label.

8. The method of claim 6, wherein:
the first association further comprises a first VPN label and the second association further comprises a second VPN label; and
the forwarding command is further configured to cause the second TP to label a packet comprising the IP address of the first CE with the first VPN label and to label a packet comprising the IP address of the third CE with the second VPN label.

9. The method of claim 6, wherein determining the optical path ID of the optical path comprises:
sending from the NC an optical path creation command to an optical domain controller (ODC) associated with the optical domain, the optical path creation command configured to cause the ODC to establish the optical path coupling the first router to the second router; and
receiving from the ODC the optical path ID, the optical path ID identifying the optical path established by the ODC in response to the optical path creation command.

10. The method of claim 6, wherein determining the optical path ID of the optical path comprises identifying an existing optical path coupling the first router in the first IP routing domain to the second router in the second IP routing domain, wherein the optical path ID comprises an identifier of the existing optical path.

11. A network node in a communication network, comprising:
a memory configured to store instructions; and
a processor coupled to the memory and configured to execute the instructions to:
receive an optical path setup command comprising an indication to establish an optical path in an optical domain of the communication network between first and second Consumer Equipment (CE), respectively coupled to first and second termination points (TPs), the optical path coupling the first and second TPs, the optical path setup command comprising an Internet Protocol (IP) address of the first CE;
determine an optical path identifier (ID) in response to the optical path setup command, the optical path ID identifying the optical path, the optical path coupling a first router in a first IP routing domain of the communication network to a second router in a second IP routing domain of the communication network, the first router coupled to the first TP and the second router coupled to the second TP;
send a mapping command to a first domain controller (DC) associated with the first IP routing domain, the mapping command comprising the optical path ID and an IP address of the first CE;
receive from the first DC routing information comprising a first association comprising the IP address of the first CE and the optical path ID; and
send a forwarding command to a second DC associated with the second IP routing domain, the forwarding command comprising the routing information received from the first DC, the forwarding command configured to cause the second TP to forward a packet comprising the IP address of the first CE to the optical path identified by the optical path ID.

12. The network node of claim 11, wherein the routing information received from the first DC further comprises a Virtual Private Network (VPN) label of the optical path.

13. The network node of claim 11, wherein the optical path ID comprises a Traffic Engineering (TE) label.

14. The network node of claim 11, wherein the processor is further configured to execute the instructions to:
send an optical path creation command to an optical domain controller (ODC) associated with the optical domain, the optical path creation command configured to cause the ODC to establish the optical path coupling the first router to the second router; and
receive from the ODC the optical path ID, the optical path ID identifying the optical path established by the ODC in response to the optical path creation command.

15. The network node of claim 11, wherein the processor is further configured to execute the instructions to determine the optical path ID of the optical path by identifying an existing optical path coupling the first router in the first IP routing domain to the second router in the second IP routing domain, wherein the optical path ID comprises an identifier of the existing optical path.

16. The network node of claim 11, wherein:
the optical path setup command further comprises an IP address of a third CE coupled to the first TP, and an indication that the optical path is a shared optical path between the first and second CEs and the second and third CEs;
the mapping command further comprises the IP address of the third CE;
the routing information further comprises a second association comprising the IP address of the third CE and the optical path ID; and
the forwarding command is further configured to cause the second TP to forward a packet comprising the IP address of the third CE to the optical path identified by the optical path ID.

17. The network node of claim 16, wherein:
the mapping command further comprises a first TE label associated with the IP address of the first CE and a second TE label associated with the IP address of the third CE;
the first association further comprises the first TE label and the second association further comprises the second TE label; and
the forwarding command is further configured to cause the second TP to label a packet comprising the IP address of the first CE with the first TE label and to label a packet comprising the IP address of the third CE with the second TE label.

18. The network node of claim 16, wherein:
the first association further comprises a first VPN label and the second association further comprises a second VPN label; and
the forwarding command is further configured to cause the second TP to label a packet comprising the IP address of the first CE with the first VPN label and to label a packet comprising the IP address of the third CE with the second VPN label.

19. The network node of claim 16, wherein the processor is further configured to execute the instructions to:
send an optical path creation command to an optical domain controller (ODC) associated with the optical domain, the optical path creation command configured to cause the ODC to establish the optical path coupling the first router to the second router; and
receive from the ODC the optical path ID, the optical path ID identifying the optical path established by the ODC in response to the optical path creation command.

20. The network node of claim 16, wherein the processor is further configured to execute the instructions to determine the optical path ID of the optical path by identifying an existing optical path coupling the first router in the first IP routing domain to the second router in the second IP routing domain, wherein the optical path ID comprises an identifier of the existing optical path.

* * * * *